(12) United States Patent
Tanoue et al.

(10) Patent No.: US 11,014,538 B2
(45) Date of Patent: May 25, 2021

(54) WIPER DEVICE

(71) Applicant: DENSO CORPORATION, Kariya (JP)

(72) Inventors: Hiroshi Tanoue, Kosai (JP); Takahiro Sumiya, Kosai (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 16/480,620

(22) PCT Filed: Jan. 31, 2018

(86) PCT No.: PCT/JP2018/003173
§ 371 (c)(1),
(2) Date: Jul. 24, 2019

(87) PCT Pub. No.: WO2018/143259
PCT Pub. Date: Aug. 9, 2018

(65) Prior Publication Data
US 2020/0198585 A1 Jun. 25, 2020

(30) Foreign Application Priority Data
Feb. 2, 2017 (JP) .............................. JP2017-017774

(51) Int. Cl.
*B60S 1/08* (2006.01)
*B60S 1/52* (2006.01)
*B60S 1/04* (2006.01)

(52) U.S. Cl.
CPC . *B60S 1/08* (2013.01); *B60S 1/04* (2013.01); *B60S 1/52* (2013.01)

(58) Field of Classification Search
CPC .................................... B60S 1/04; B60S 1/08
See application file for complete search history.

(56) References Cited

U.S. PATENT DOCUMENTS

| | | | | |
|---|---|---|---|---|
| 4,742,280 A | * | 5/1988 | Ishikawa | ................. B60S 1/482 318/282 |
| 6,335,601 B1 | * | 1/2002 | Kato | ......................... B60S 1/08 318/256 |
| 2004/0075409 A1 | * | 4/2004 | Hospital | ................. B60S 1/185 318/443 |

FOREIGN PATENT DOCUMENTS

JP  2011-218998 A  11/2011

* cited by examiner

*Primary Examiner* — Michael D Jennings
(74) *Attorney, Agent, or Firm* — Oliff PLC (57) ABSTRACT

In a case in which an instruction to change to a wiping speed, which is determined from a target speed map, is inputted at a time during control of a rotational speed of a wiper motor that is based on a target speed map, a microcomputer gradually changes the rotational speed of the wiper motor from a rotational speed determined from a target speed map to a rotational speed determined by a target speed map. Further, in a case in which a wiper switch is operated while wiper blades exist within a switching prohibited region, the microcomputer switches a target speed map that is used from a time that the wiper blades reach reversal positions.

6 Claims, 7 Drawing Sheets

WIPER DEVICE

TECHNICAL FIELD

The present invention relates to a wiper device.

BACKGROUND ART

Figure 7:
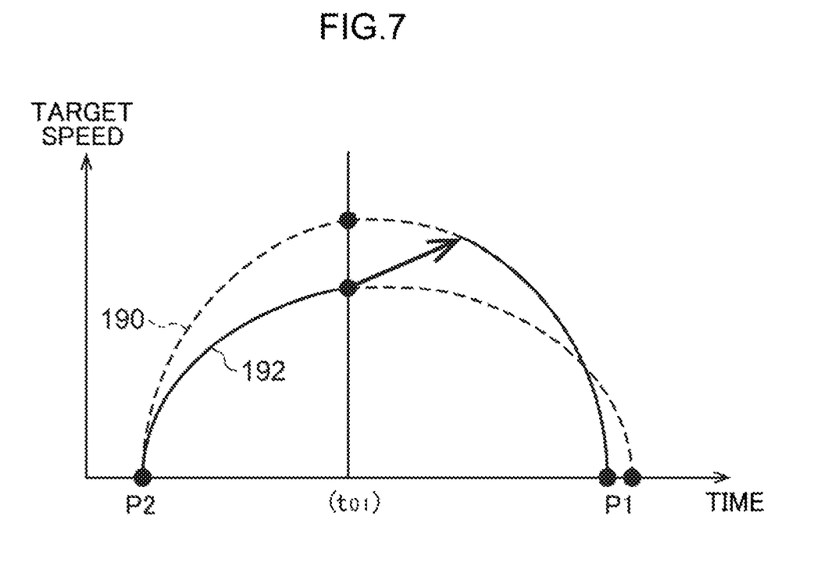
FIG. 7 is an explanatory drawing showing an example of a case in which a wiper switch is switched, and a wiping speed is gradually changed from a target speed shown by a target speed map for low speeds to a target speed shown by a target speed map for high speeds.

A wiper device, which operates wiper blades to wipe between upper reversal positions and lower reversal positions on a windshield glass of a vehicle, is structured such that the speed of the wiping operation of the wiper blades can be changed. The wiping operation of the wiper device is controlled on the basis of a target speed map that sets in advance target speeds for positions of the wiper blades on the windshield glass. In a case in which the speed of the wiping operation (the wiping speed) is to be changed, the wiping speed is changed by using a target speed map in which the target speeds differ from the target speed map that is being used at the current point in time. A target speed map is as shown in FIG. 7. For example, the positions of the wiper blades are defined on the horizontal axis by the rotational angle of the wiper motor or by time, and the target speed is defined on the vertical axis. In FIG. 7, P1 shows the upper reversal positions of the wiping ranges, and P2 shows the lower reversal positions of the wiping ranges.

Japanese Patent Application Laid-Open (JP-A) No. 2011-218998 (Patent Document 1) discloses an invention of a wiper controlling device that, in a case in which the wiper blades that have stopped between reversal positions are restarted, starts the wiper motor at a "smooth start-up speed" that is slower than the standard motor speed that is used at the time of the usual wiping operation.

SUMMARY OF INVENTION

Technical Problem

However, the control at the "smooth start-up speed" that is recited in Patent Document 1 is applied to cases in which the wiper blades that have stopped midway between the reversal positions are restarted. Cases in which an instruction is given to change the wiping speed during the wiping operation from low speed to high speed, for example, are not limited to this. Even if, as shown in FIG. 7, a wiper switch is switched at time t01, and the wiping speed is gradually changed such as at a "smooth start-up speed" from a target speed shown by target speed map 192 for low speeds to a target speed shown by target speed map 190 for high speeds, depending on the time that the wiper switch is operated, there is the concern that the wiper blades will reach the upper reversal positions P1 before the actual wiping speed reaches the post-switching target speed.

As a result, not only is there the concern that the wiper blades will over-run at the upper reversal positions P1, but there is also the concern that the user will feel that something is out of place in the operation of the wiper device.

The present invention was made in view of the aforementioned, and an object thereof is to provide a wiper device that can smoothly change the wiping speed of wiper blades.

Solution to Problem

In order to achieve the above-described object, a wiper device relating to a first aspect includes: a wiper motor that operates wiper blades to wipe reciprocally, by rotation of an output shaft; and a control section that controls rotation of the wiper motor in accordance with a command signal, and that, in a case in which the command signal is changed in a state in which the wiper blades that are in the midst of reciprocal wiping operation are positioned in a switching prohibited region that is before reversal positions of the reciprocal wiping operation, controls the rotation of the wiper motor in accordance with a pre-change command signal until the wiper blades reach the reversal positions, and that, at a time when the wiper blades reverse at the reversal positions, controls the rotation of the wiper motor on the basis of a post-change command signal.

In accordance with this wiper device, in a case in which the wiper blades are within the switching prohibited region that is before the reversal positions, changing of the wiping speed is not carried out even if the wiper switch is operated, and the wiping speed is changed from the time that the wiper blades reach the reversal positions. Therefore, the wiping speed of the wiper blades can be changed smoothly.

In a wiper device relating to a second aspect, in the first aspect, in a case in which the command signal is changed in a state in which the wiper blades that are in the midst of the reciprocal wiping operation are positioned in a region outside of the switching prohibited region, the control section carries out control that gradually changes rotational speed from a rotational speed that corresponds to the pre-change command signal to a rotational speed that corresponds to the post-change command signal.

In accordance with this wiper device, the wiping speed of the wiper blades can be changed smoothly by gradually changing the wiping speed within a predetermined switching time.

In a wiper device relating to a third aspect, in the second aspect, a time over which the rotational speed is gradually changed, or a rate of change in the rotational speed at which the rotational speed is gradually changed, is determined in advance.

In accordance with this wiper device, the time over which the rotational speed is gradually changed, or the rate of change in the rotational speed at which the rotational speed is gradually changed, is determined in advance. The wiping speed of the wiper blades can be smoothly changed in accordance with the determined time or rate of change.

DESCRIPTION OF EMBODIMENTS

First Embodiment

Figure 1:
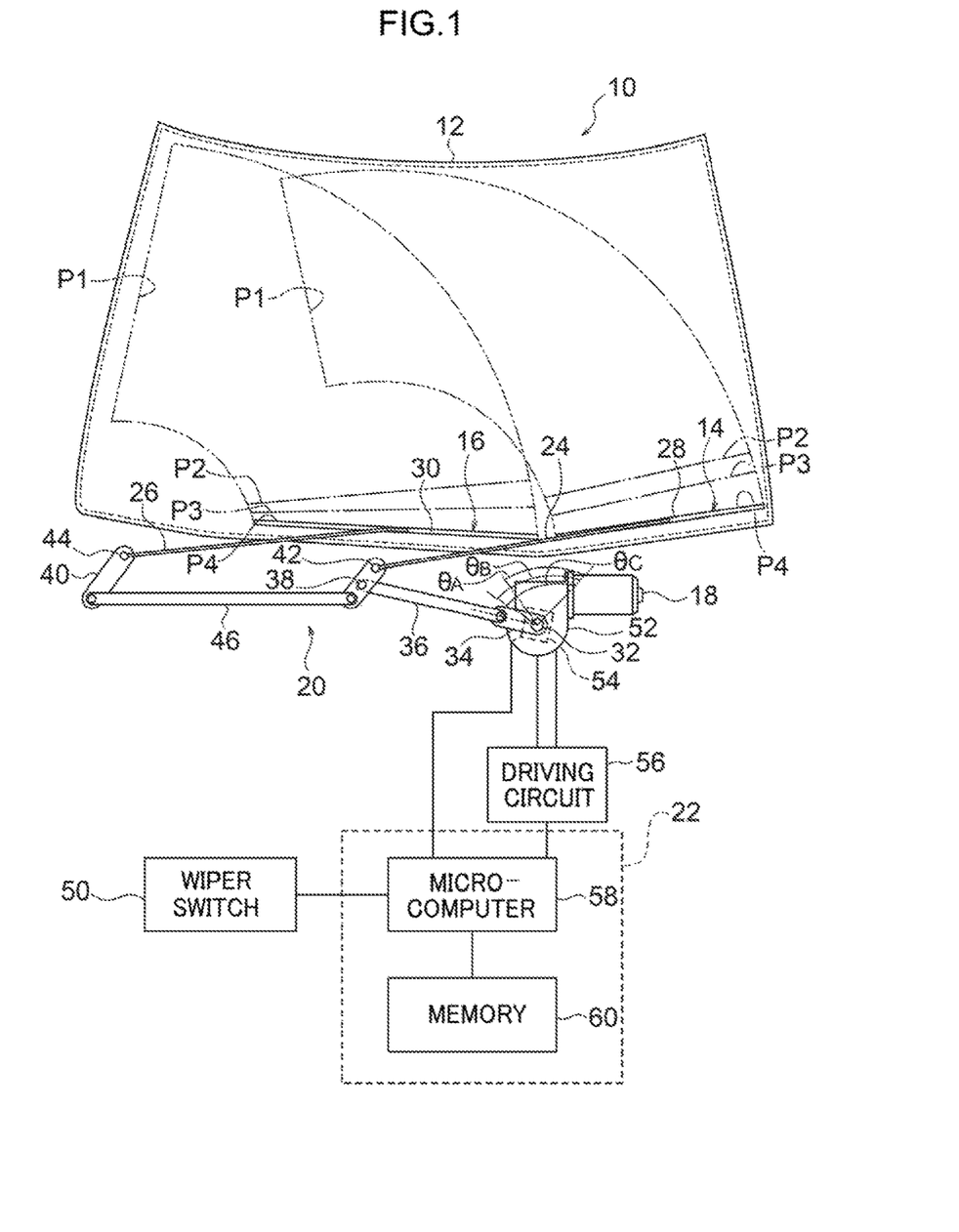
FIG. 1 is a schematic drawing showing the structure of a wiper device relating to a first embodiment of the present invention.

FIG. 1 is a schematic drawing showing the structure of a wiper device 10 relating to the present embodiment. The wiper device 10 is for wiping a windshield glass 12 that is provided at a vehicle such as a passenger vehicle or the like for example. The wiper device 10 has a pair of wipers 14, 16, a wiper motor 18, a link mechanism 20, and a wiper control circuit 22 that corresponds to the core of the wiper device 10.

The wipers 14, 16 are structured by wiper arms 24, 26 and wiper blades 28, 30, respectively. The proximal end portions of the wiper arms 24, 26 are respectively fixed to pivot shafts 42, 44 that are described later. The wiper blades 28, 30 are respectively fixed to the distal end portions of the wiper arms 24, 26.

At the wipers 14, 16, the wiper blades 28, 30 move reciprocally on the windshield glass 12 accompanying the rotation of the wiper arms 24, 26, and the wiper blades 28, 30 wipe the windshield glass 12. Further, the lower reversal positions P2 at times of high-speed wiping, lower reversal positions P3 at times of low-speed wiping, and stored positions P4 are provided at the lower portion of the windshield glass 12.

The wiper motor 18 has an output shaft 32 that can rotate forward and reversely via a speed reduction mechanism 52 that is mainly structured by a worm gear. The link mechanism 20 has a crank arm 34, a first link rod 36, a pair of pivot levers 38, 40, the pair of pivot shafts 42, 44, and a second link rod 46.

One end side of the crank arm 34 is fixed to the output shaft 32. The other end side of the crank arm 34 is rotatably connected to one end side of the first link rod 36. Further, the other end side of the first link rod 36 is rotatably connected to a place, which is near to the end that is different than the end having the pivot shaft 42, of the pivot lever 38. The both ends of the second link rod 46 are rotatably connected respectively to the end, which is different than the end having the pivot shaft 42, of the pivot lever 38 and the end, which corresponds to that end of the pivot lever 38, at the pivot lever 40.

The pivot shafts 42, 44 are rotatably supported by unillustrated pivot holders that are provided at the vehicle body. The wiper arms 24, 26 are respectively fixed via the pivot shafts 42, 44 to the ends, which have the pivot shafts 42, 44, of the pivot levers 38, 40.

At the wiper device 10 relating to the present embodiment, when the output shaft 32 is rotated forward and reversely, the rotational force of this output shaft 32 is transmitted via the link mechanism 20 to the wiper arms 24, 26, and, accompanying the reciprocal rotation of the wiper arms 24, 26, the wiper blades 28, 30 reciprocally move on the windshield glass 12. For example, when the output shaft 32 is rotated forward and reversely in a range of rotational angle $\theta_A$, the wiper blades reciprocally move between the lower reversal positions P2 at the time of high-speed wiping and the upper reversal positions P1. When the output shaft 32 is rotated forward and reversely in the range of rotational angle $\theta_B$, the wiper blades reciprocally move between the lower reversal positions P3 at the time of low-speed wiping and the upper reversal positions P1. Further, when the output shaft 32 is rotated forward and reversely in the range of rotational angle $\theta_C$, the wiper blades reciprocally move between the stored positions P4 and the upper reversal positions P1. A case in which the output shaft 32 is rotated forward and reversely in the range of rotational angle $\theta_A$ is a case in which a wiper switch 50 that is described later is at a high-speed operation mode selecting position. Further, a case in which the output shaft 32 is rotated forward and reversely in the range of rotational angle $\theta_B$ is a case in which the wiper switch 50 that is described later is at a low-speed operation mode selecting position or an intermittent operation mode selecting position.

In the wiper device 10 relating to the present embodiment, as shown in FIG. 1, in a case in which the wiper blades 28, 30 are positioned at the stored positions P4, the crank arm 34 and the first link rod 36 are a linear structure.

The wiper control circuit 22 for controlling rotation of the wiper motor 18 is connected to the wiper motor 18. The wiper control circuit relating to the present embodiment is structured to have a microcomputer 58 that, from the rotational angle of the output shaft 32 that is sensed by the absolute angle sensor 54, controls a driving circuit 56 such that the rotational speed of the output shaft 32 changes in accordance with the positions of the wiper blades 28, 30 on the windshield glass 12, and a memory 60 that stores data that is used in controlling the driving circuit 56. The wiper switch 50 is connected to the microcomputer 58.

Figure 3:
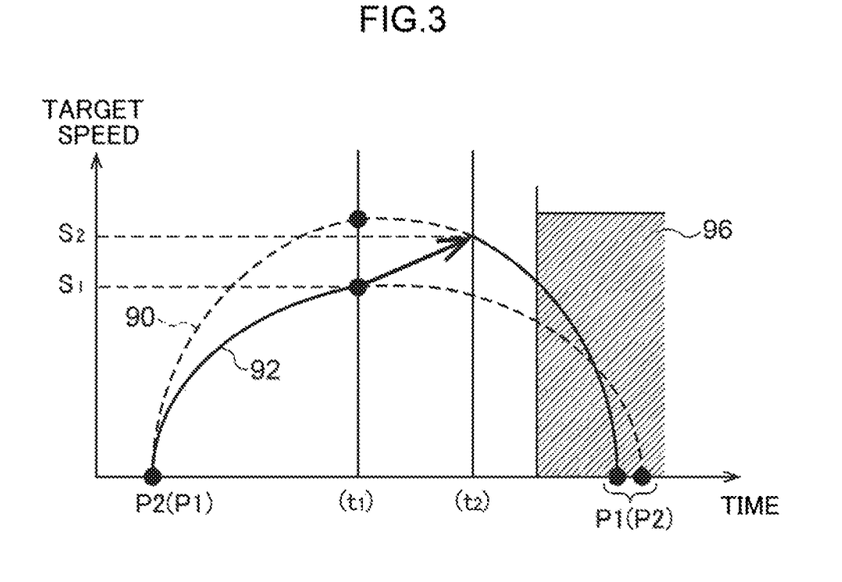
FIG. 3 is an explanatory drawing showing an example of, at the wiper device relating to the first embodiment of the present invention, a case of changing from a target speed, which is determined by a target speed map corresponding to times of low-speed wiping, to a target speed that is determined by a target speed map corresponding to times of high-speed wiping.

The memory 60 stores target speed maps that prescribe rotational speeds of the wiper motor 18 in accordance with the positions of the wiper blades 28, 30. Target speed maps 90, 92 of FIG. 3 are examples of the target speed maps of the present embodiment. As shown in FIG. 3, the target speed maps trace curves that are convex upward such that the rotational speed of the wiper motor 18 is set to 0 at a start position $\theta_0$ (the upper reversal positions P1), a target wiping position $\theta_1$ (the lower reversal positions P2 at the time of high-speed wiping) and a target wiping position $\theta_2$ (the lower reversal positions P3 at the time of low-speed wiping) and such that the rotational speed of the wiper motor 18 becomes a maximum between the upper reversal positions P1 and the lower reversal positions P2 at the time of high-speed wiping. The horizontal axis in FIG. 3 is time. Therefore, in target speed map 92 in which the wiping speed is slow, it takes time for the wiper blades 28, 30 to reach one of the reversal positions, as compared with the target speed map 90 in which the wiping speed is fast. Further, the target speed maps 90, 92 may be used in controlling the rotation of the wiper motor, with the horizontal axis of the target speed maps 90, 92 in FIG. 3 being the rotational angle of the output shaft 32 of the wiper motor 18. With such target speed maps, the fact that the rotational angle of the output shaft 32 corresponds to the positions of the wiper blades 28, 30 is taken into consideration, and the positions of the wiper blades 28, 30 can be prescribed by the rotational angle of the output shaft 32.

When the wiper switch 50 is turned on, the microcomputer 58 controls the driving circuit 56 in accordance with the target speed maps that are stored in the memory 60 and the rotational angle of the output shaft 32 of the wiper motor 18 that is detected by the absolute angle sensor 54.

The absolute angle sensor 54 is provided within the speed reduction mechanism 52 of the wiper motor 18, and is a sensor that detects the rotational angle of the output shaft 32. As an example, the absolute angle sensor is an MR sensor that uses a magnetoresistance effect element, and detects the magnetic field of a sensor magnet (not illustrated) that is provided at the end of the output shaft 32. The absolute angle sensor 54 outputs, by serial communication, a signal that corresponds to changes in the magnetic field of the sensor magnet due to rotation of the output shaft 32, and the microcomputer 58 calculates the rotational angle of the output shaft 32 from the signal inputted from the absolute angle sensor 54.

The microcomputer 58 refers to the target speed maps that are stored in the memory 60 and whose horizontal axis is the rotational angle of the output shaft 32, and extracts the rotational speed that corresponds to the calculated rotational angle of the output shaft 32 in a target speed map, and controls the driving circuit 56 such that the rotational angle of the output shaft 32 of the wiper motor 18 becomes the rotational speed extracted from the target speed map.

The driving circuit 56 generates, by PWM (pulse width modulation), voltage that is to be applied to the wiper motor 18. The driving circuit 56 includes an H-bridge circuit that uses FETs (field effect transistors) as the switching elements. The driving circuit 56 outputs voltage of a predetermined duty ratio due to control of the microcomputer 58.

Because the wiper motor 18 relating to the present embodiment has the speed reduction mechanism 52 as described above, the rotational speed and the rotational angle of the output shaft 32 are not the same as the rotational speed and the rotational angle of the wiper motor main body. However, in the present embodiment, because the wiper motor main body and the speed reduction mechanism 52 are structured integrally and inseparably, hereinafter, the rotational speed and the rotational angle of the output shaft 32 are considered to be the same as the rotational speed and the rotational angle of the wiper motor 18.

The wiper switch 50 is a switch that turns on or off the electric power that is supplied from the battery of the vehicle to the wiper motor 18.

The wiper switch 50 can be switched to a low-speed operation mode selecting position of rotating the wiper blades 28, 30 at a low speed, a high-speed operation mode selecting position of rotating the wiper blades 28, 30 at a high speed, an intermittent operation mode selecting position of rotating the wiper blades 28, 30 intermittently at a constant period, and a stored (stopped) mode selecting position. Further, the wiper switch 50 outputs signals corresponding to the selecting positions of the respective modes to the microcomputer 58.

When the signals that are outputted from the wiper switch 50 in accordance with the selecting positions of the respective modes are inputted to the wiper control circuit 22, the wiper control circuit 22 carries out, in accordance with the target speed maps that are stored in the memory 60, control that corresponds to the output signal from the wiper switch 50.

Figure 2:
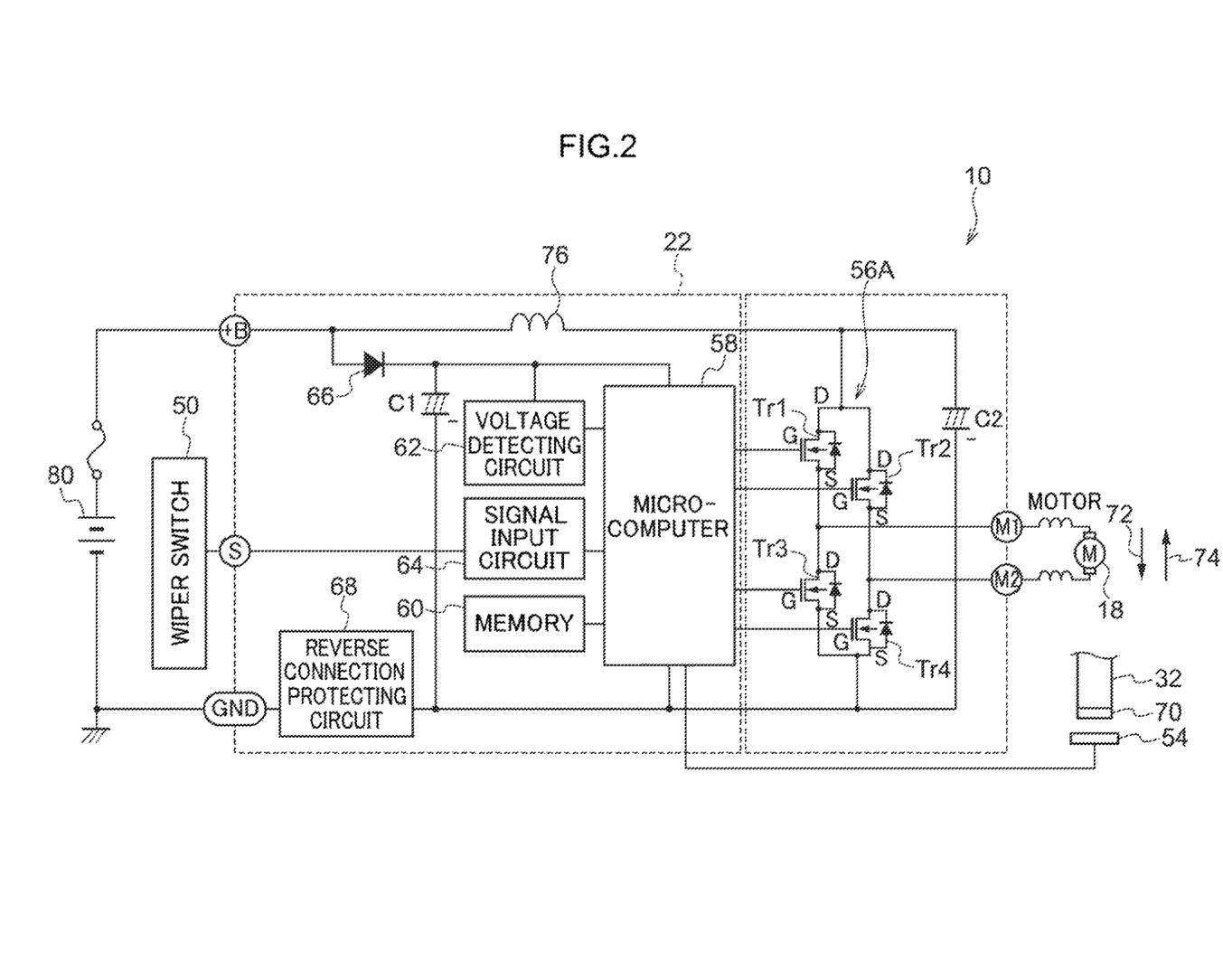
FIG. 2 is a block drawing showing an example of an overview of the structure of the wiper device relating to the first embodiment of the present invention.

FIG. 2 is a block drawing showing an example of an overview of the structure of the wiper device 10 relating to the present embodiment. Further, the wiper motor 18 shown in FIG. 2 is, as an example, a DC brush motor.

The wiper device 10 shown in FIG. 2 includes the driving circuit 56 that generates voltage that is applied to the terminals of the coil of the wiper motor 18, and the microcomputer 58 of the wiper control circuit 22 that controls the on and off of the switching elements that structure the driving circuit 56. Electric power of a battery 80 is supplied via diode 66 to the microcomputer 58, and the voltage of the supplied electric power is sensed by a voltage detecting circuit 62 that is provided between the diode 66 and the microcomputer 58, and the results of sensing are outputted to the microcomputer 58. Further, an electrolytic capacitor C1, whose one end is connected between the diode 66 and the microcomputer 58 and whose other end (−) is grounded, is provided. The electrolytic capacitor C1 is a capacitor for stabilizing the power supply of the microcomputer 58. The electrolytic capacitor C1 protects the microcomputer 58 by, for example, storing sudden high voltage such as a surge or the like and discharging it to a ground region.

A command signal for instructing the rotational speed of the wiper motor 18 is inputted from the wiper switch 50 via a signal input circuit 64 to the microcomputer 58. In a case in which the command signal that is outputted from the wiper switch 50 is an analog signal, this signal is digitized at the signal input circuit 64 and is inputted to the microcomputer 58.

Further, the absolute angle sensor 54, which senses the electric field of a sensor magnet 70 that varies in accordance with the rotation of the output shaft 32, is connected to the microcomputer 58. Due to the microcomputer 58 calculating the rotational angle of the output shaft 32 on the basis of the signal that the absolute angle sensor 54 outputs, the microcomputer 58 specifies the positions of the wiper blades 28, 30 on the windshield glass 12. Further, the microcomputer 58 calculates the rotational speed of the output shaft 32 from the change in the rotational angle of the output shaft 32 at a unit time.

Moreover, the microcomputer 58 refers to the target speed maps that are stored in the memory 60 and that prescribe the rotational speed of the wiper motor 18 in accordance with the positions of the wiper blades 28, 30, and controls the driving circuit 56 such that the rotation of the wiper motor 18 becomes a rotational speed corresponding to the specified positions of the wiper blades 28, 30. In a case in which deviation arises between the rotational speed of the output shaft 32, which is calculated from the rotational angle detected by the absolute angle sensor 54, and the rotational speed that corresponds to the positions of the wiper blades 28, 30, that deviation is cancelled, and the rotational speed of the output shaft 32 is controlled.

As shown in FIG. 2, the driving circuit 56 has an H-bridge circuit 56A that uses transistors Tr1, Tr2, Tr3, Tr4 that are N-type FETs at the switching elements. The drains of the transistor Tr1 and the transistor Tr2 are respectively connected to the battery 80 via a noise preventing coil 76, and the sources are connected to the drains of the transistor Tr3 and the transistor Tr4, respectively. Further, the sources of the transistor Tr3 and the transistor Tr4 are grounded.

The source of the transistor Tr1 and the drain of the transistor Tr3 are connected to one end of the coil of the wiper motor 18. The source of the transistor Tr2 and the drain of the transistor Tr4 are connected to the other end of the coil of the wiper motor 18.

Due to a high-level signal being inputted to the respective gates of the transistor Tr1 and the transistor Tr4, the transistor Tr1 and the transistor Tr4 are turned on, and CW current 72, which operates the wiper blades 28, 30 clockwise as seen from the vehicle cabin side for example, flows to the wiper motor 18. Moreover, when one of the transistor Tr1 and the transistor Tr4 is controlled to be on, due to the other being on/off controlled in small increments by PWM control, the voltage of the CW current 72 can be modulated.

Further, due to a high-level signal being inputted to the respective gates of the transistor Tr2 and the transistor Tr3, the transistor Tr2 and the transistor Tr3 are turned on, and CCW current 74, which operates the wiper blades 28, 30 counterclockwise as seen from the vehicle cabin side for example, flows to the wiper motor 18. Moreover, when one of the transistor Tr2 and the transistor Tr3 is controlled to be on, due to the other being on/off controlled in small increments by PWM control, the voltage of the CCW current 74 can be modulated.

In the present embodiment, a reverse connection protecting circuit 68 and the noise preventing coil 76 are provided between the battery 80 that is the power source and the driving circuit 56, and the electrolytic capacitor C2 is provided in parallel to the driving circuit 56. The noise preventing coil 76 is an element for controlling noise that is generated by switching of the driving circuit 56.

The electrolytic capacitor C2 mitigates noise that is generated from the driving circuit 56, and is an element for, by storing sudden high voltage such as a surge or the like and discharging it to a ground region, preventing excessive current from being inputted to this high-voltage driving circuit 56.

The reverse connection protecting circuit 68 is a circuit for protecting the elements that structure the wiper control circuit 22, in a case in which the positive electrode and the negative electrode of the battery 80 are connected oppositely to the case shown in FIG. 2. The reverse connection protecting circuit 68 is, as an example, structured by a so-called diode-connected FET in which its own drain and gate are connected, or the like.

Operation and effects of the wiper device 10 relating to the present embodiment are described hereinafter. FIG. 3 shows an example of, at the wiper device 10 relating to the present embodiment, a case of changing from a target speed that is determined by the target speed map 92 that corresponds to times of low-speed wiping to a target speed that is determined by the target speed map 90 that corresponds to times of high-speed wiping. The horizontal axis in FIG. 3 is time. P1 and P2 on the horizontal axis of FIG. 3 show times in cases in which the wiper blades 28, 30 reach the upper reversal positions P1 and the lower reversal positions P2 at times of high-speed wiping. Accordingly, P1 (P2) of the target speed map 92 that corresponds to times of low-speed wiping is a time that is later in time than P1 (P2) of the target speed map 90 that corresponds to times of high-speed wiping.

As shown in FIG. 3, a case of changing from a target speed determined by the target speed map 92 to a target speed determined by the target speed map 90 is a case in which, at time t1, the wiper switch 50 is switched from the low-speed operation mode selecting position to the high-speed operation mode selecting position. In the present embodiment, in the interval from time t1 to time t2, the target speed gradually approaches the target speed determined by the target speed map 90, from the target speed determined by the target speed map 92.

In the present embodiment, the target speed that is the wiping speed varies linearly as shown in FIG. 3, and the rate of change in the target speed is constant. For example, in a case in which the target speed at time t1 (the pre-switching target speed) in FIG. 3 is $S_1$, the target speed at time t2 (the post-switching target speed) is $S_2$, and the time required for switching the wiping speed is t2−t1=$T_1$, rate of change α in the target speed is calculated by following formula (1). The switching time $T_1$ is concretely determined by calculations at the time of designing and by testing of actual devices, so that the switching of the wiping speed is carried out smoothly.

$$\alpha = (S_2 - S_1)/T_1 \quad (1)$$

The rate of change α may be a value that is determined in advance. When the wiper switch 50 is operated, the wiping speed is changed gradually in accordance with the rate of change α, and, when the post-change target speed has been reached, the processing of changing the speed ends. In such a case, the switching time $T_1$ varies in accordance with the difference in the target speeds before and after the changing. Further, other than in a linear form such as in FIG. 3, the rate of change α may be varied so as to exhibit the form of a curve that changes in accordance with time or position.

In a case in which the time t1, at which the wiper switch 50 is switched from the low-speed operation mode selecting position to the high-speed operation mode selecting position, is near the time when the wiper blades 28, 30 arrive at the upper reversal positions P1 (or the lower reversal positions P2 at the time of high-speed wiping), there is the concern that the wiper blades will reach the upper reversal positions P1 (or the lower reversal positions P2 at the time of high-speed wiping) before the actual wiping speed reaches the post-switching target speed.

In the present embodiment, as shown in FIG. 3, a range of a predetermined time that includes the time when the wiper blades 28, 30 reach the upper reversal positions P1 (or the lower reversal positions P2 at the time of high-speed wiping), or a range of predetermined positions of the wiper blades 28, 30, is made to be a switching prohibited region 96. In a case in which aforementioned time t1 is within the switching prohibited region 96, changing of the wiping speed is not carried out from time t1, and, until the upper reversal positions P1 (or the lower reversal positions P2 at the time of high-speed wiping) are reached, the wiper blades 28, 30 are operated to wipe by using the pre-switching target speed map 92 as the command values. Then, when the wiper blades 28, 30 reach the upper reversal positions P1 (or the lower reversal positions P2 at the time of high-speed wiping), control is switched to control of the wiping speed that uses the target speed map 90, which is the post-switching target speed map, as the command values.

In the present embodiment, in a case in which the wiper switch 50 is operated during the wiping operation while the wiper blades 28, 30 are between the upper reversal positions P1 and the lower reversal positions P2 at the time of high-speed wiping (or the lower reversal positions P3 at the time of low-speed wiping), in accordance with the rate of change α of the target speed such as expressed by above formula (1), the target speed is gradually changed, and the actual wiping speed is changed in accordance with this change in the target speed. However, in a case in which the timing at which the wiper switch 50 is operated is when the wiper blades 28, 30 have reached close to the upper reversal positions P1 (the lower reversal positions P2 at the time of high-speed wiping or the lower reversal positions P3 at the time of low-speed wiping), in the gradual changing of the wiping speed in accordance with the rate of change α, before the wiping speed reaches the post-switching target speed, the wiper blades 28, 30 reach vicinities of the upper reversal positions P1 (the lower reversal positions P2 at the time of high-speed wiping or the lower reversal positions P3 at the time of low-speed wiping). As a result, at the upper reversal positions P1 (the lower reversal positions P2 at the time of high-speed wiping or the lower reversal positions P3 at the time of low-speed wiping), there are cases in which the wiper blades 28, 30 overlap, and there are cases in which the user feels that something is out of place in the operation of the wiper device 10.

In the present embodiment, as described above, in a case in which the timing at which the wiper switch is operated is within the switching prohibited region 96, at the time when the wiper blades 28, 30 reach the upper reversal positions P1 (the lower reversal positions P2 at the time of high-speed wiping or the lower reversal positions P3 at the time of low-speed wiping), by switching the target speed map that is used in control, disorder in the wiping operation that accompanies a change in the wiping speed in vicinities of the upper reversal positions P1 (the lower reversal positions P2 at the time of high-speed wiping or the lower reversal positions P3 at the time of low-speed wiping) is prevented.

The range of the switching prohibited region 96 differs in accordance with the specifications of the wiper device 10. However, as an example, the switching prohibited region 96 starts from a time that is an amount of time, which corresponds to the switching time $T_1$, or that is more than that amount of time before the wiper blades 28, 30 reach the upper reversal positions P1 (the lower reversal positions P2 at the time of high-speed wiping or the lower reversal positions P3 at the time of low-speed wiping).

Note that, although the horizontal axis in FIG. 3 is time, the horizontal axis may show positions of the wiper blades 28, 30 that are based on the rotational angle of the output shaft 32 of the wiper motor 18 that is sensed by the absolute angle sensor 54. In such a case, the switching prohibited region 96 starts from the positions of the wiper blades 28, 29 that are at an amount of time, which corresponds to the switching time $T_1$, or that are at more than that amount of time before the wiper blades reach the upper reversal positions P1 (the lower reversal positions P2 at the time of high-speed wiping).

Figure 4:
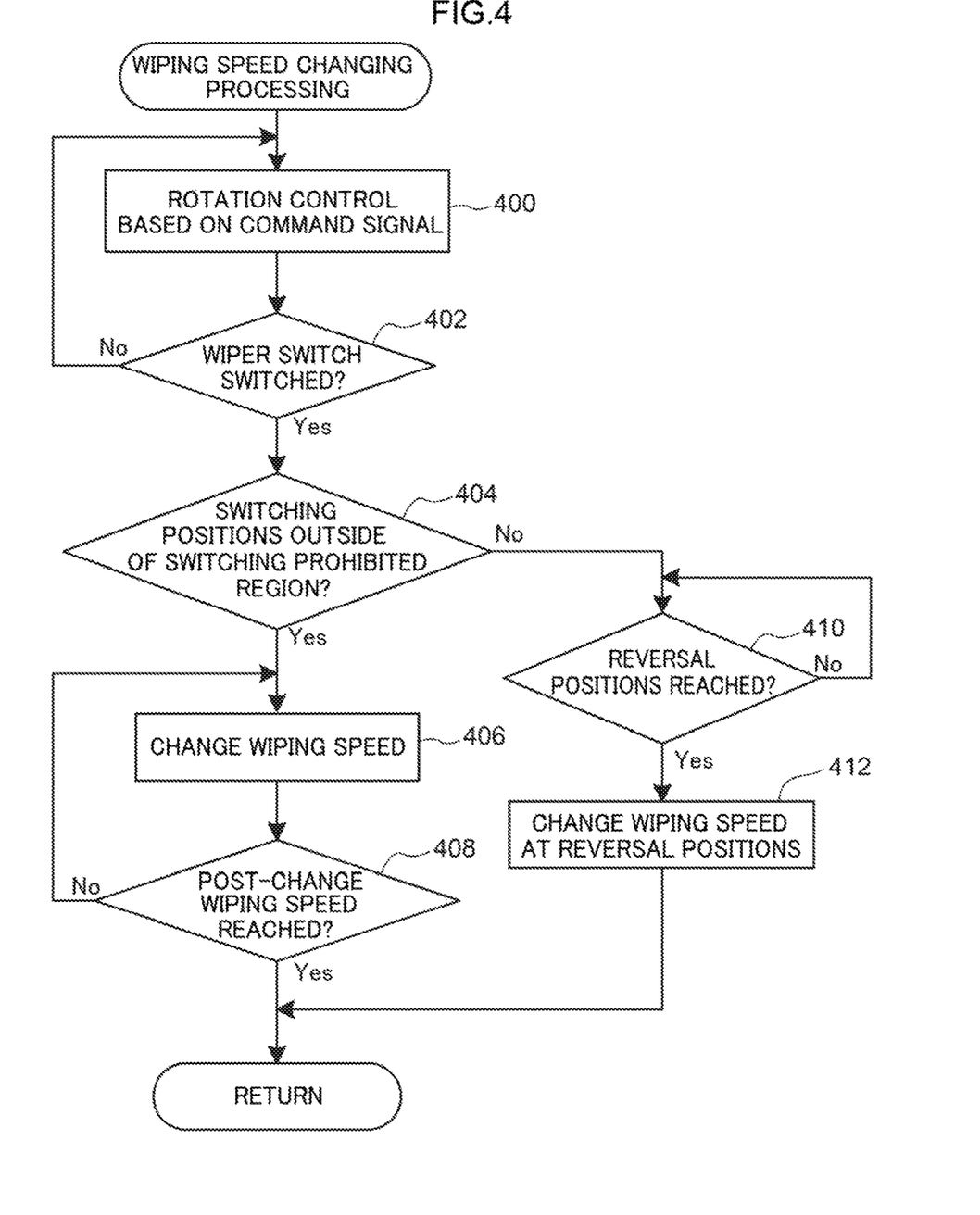
FIG. 4 is a flowchart showing an example of wiping speed changing processing of the wiper device relating to the first embodiment of the present invention.

FIG. 4 is a flowchart showing an example of wiping speed changing processing of the wiper device 10 relating to the present embodiment. In step 400, rotation control that is based on a command signal that corresponds to the position of the wiper switch 50 is carried out.

In step 402, it is judged whether the wiper switch 50 has been operated and a change in the command signal has arisen. In the case of a negative judgment, the process of step 400 continues. In the case of an affirmative judgment, in step 404, it is judged whether or not the time that the wiper switch 50 was operated, or the positions of the wiper blades 28, 30 at the time when the wiper switch 50 was operated, are outside of the switching prohibited region 96.

In the case of an affirmative judgment in step 404, the wiping speed is changed in step 406. In step 408, it is judged whether or not the actual wiping speed of the wiper blades 28, 30 has reached the post-change wiping speed. In the case of a negative judgment, the changing of the wiping speed in step 406 continues. In the case of an affirmative judgment, the processing returns.

In the case of a negative judgment in step 404, in step 410, it is judged whether or not the wiper blades 28, 30 have reached the upper reversal positions P1 or the lower reversal positions P2 at the time of high-speed wiping. In the case of a negative judgment in step 410, the wiping operation at the pre-change wiping speed is continued until the wiper blades 28, 30 reach the upper reversal positions P1 or the lower reversal positions P2 at the time of high-speed wiping. In the case of an affirmative judgment in step 410, the wiping speed is changed at the reversal positions reached in step 412, and the processing returns.

As described above, in accordance with the present embodiment, in a case in which the timing at which the wiper switch is operated is near the reversal positions, at the time when the wiper blades 28, 30 reach the reversal positions, control that changes the wiping speed based on operation of the wiper switch 50 is carried out. Due to this control, hunting of the wiping operation of the wiper blades in vicinities of the reversal positions can be suppressed, and the wiping speed of the wiper blades can be changed smoothly.

Second Embodiment

A second embodiment of the present invention is described next. In the present embodiment, the point that a wiper motor 118 is a brushless DC motor differs from the first embodiment. However, the other structures are the same as those of the first embodiment shown in FIG. 1, and therefore, detailed description thereof is omitted.

Figure 5:
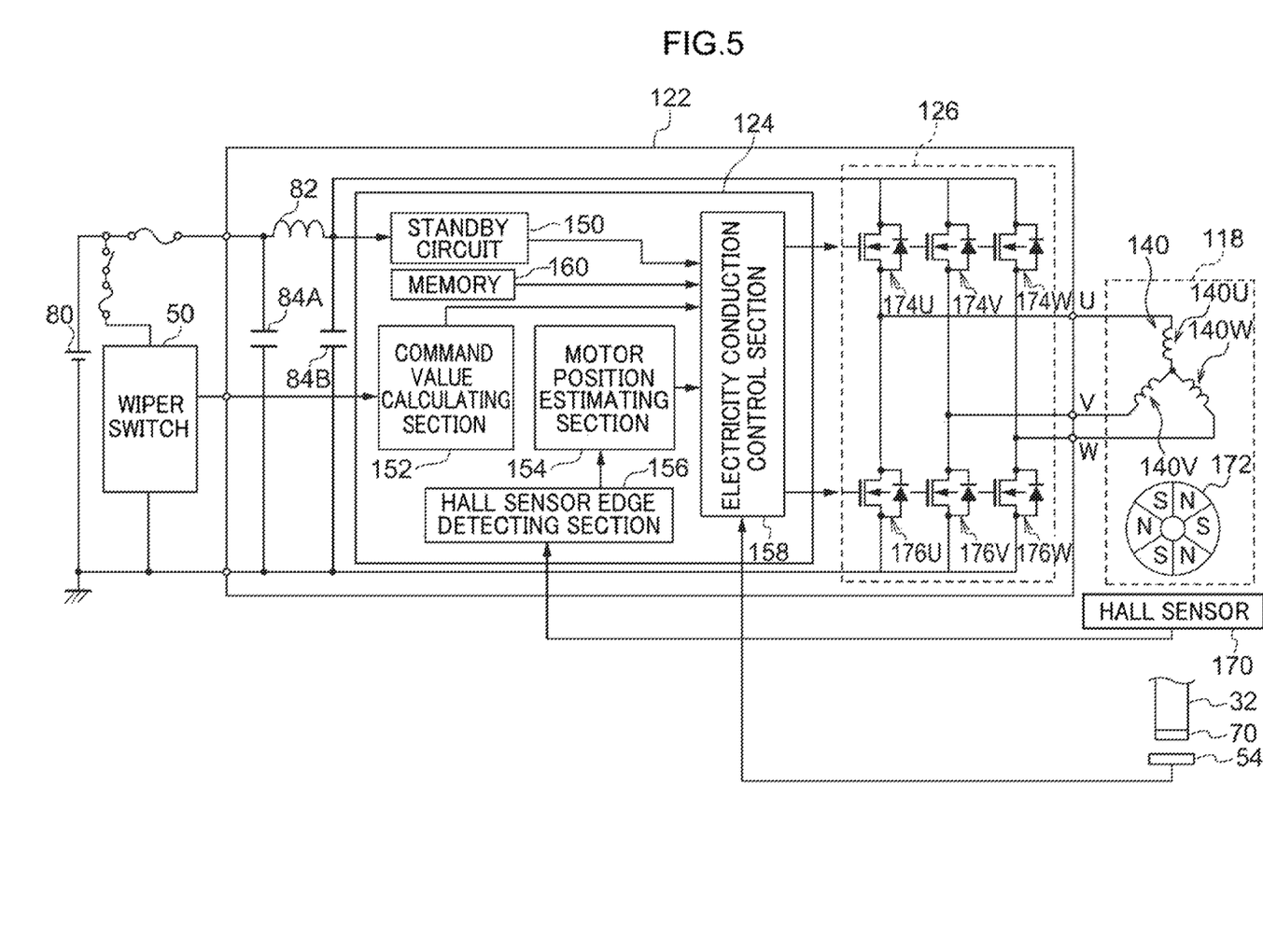
FIG. 5 is a block drawing showing an overview of an example of the structure of a wiper control circuit relating to a second embodiment of the present invention.

FIG. 5 is a block drawing showing the overview of an example of the structure of a wiper control circuit 122 relating to the present embodiment. The wiper control circuit 122 shown in FIG. 5 includes a driving circuit 126 that generates voltage to be applied to the terminals of the coils of the wiper motor 118, and a microcomputer 124 that controls the on and off of the switching elements that structure the driving circuit 126.

The microcomputer 124 refers to target speed maps that are stored in a memory 160 and that prescribe rotational speeds of the wiper motor 118 in accordance with the positions of the wiper blades 28, 30, and controls the driving circuit 126 such that rotation of the wiper motor 118 becomes a rotational speed corresponding to specified positions of the wiper blades 28, 30. In a case in which deviation arises between the rotational speed of the output shaft 32, which is calculated from the rotational angle detected by the absolute angle sensor 54, and the rotational speed that corresponds to the positions of the wiper blades 28, 30, that deviation is cancelled, and the rotational speed of the output shaft 32 is controlled.

A rotor 172 of the wiper motor 118 is structured by three of each of S-pole and N-pole permanent magnets. The magnetic field of the rotor 172 is sensed by a Hall sensor 170. The Hall sensor 170 may sense the magnetic field of a sensor magnet that is provided separately from the rotor 172, in accordance with the polarities of the permanent magnets of the rotor 172. The Hall sensor 170 senses the magnetic field of the rotor 172 or of the senor magnet as a magnetic field that expresses the position of the rotor 172.

The Hall sensor 170 is a sensor that detects the position of the rotor 172 by detecting the magnetic field formed by the rotor 172 or the sensor magnet. The Hall sensor 170 includes three Hall elements that correspond to the respective phases of U, V, W. The Hall sensor 170 outputs changes in the magnetic field that are generated by rotation of the rotor 172, as a signal of the changes in voltage that approximates a sine wave.

The signal that the Hall sensor 170 outputs is inputted to the microcomputer 124 that is the control circuit. The microcomputer 124 is an integrated circuit, and the electric power, which is supplied from the battery 80 that is the power source, is controlled by a standby circuit 150.

The analog waveform signal that is inputted from the Hall sensor 170 to the microcomputer 124 is inputted to a Hall sensor edge detecting section 156 that is within the microcomputer 124 and that has a circuit such as a comparator that converts analog signals into digital signals. At the Hall sensor edge detecting section 156, the inputted analog waveform is converted into a digital waveform, and the edge portions are detected from the digital waveform.

Information of the digital waveform and the edges is inputted to a motor position estimating section 154, and the position of the rotor 172 is calculated. Information of the calculated position of the rotor 172 is inputted to an electricity conduction control section 158.

Further, a signal for instructing the rotational speed of the wiper motor 118 (the rotor 172) is inputted from the wiper switch 50 to a command value calculating section 152 of the microcomputer 124. The command value calculating section 152 extracts, from the signal inputted from the wiper switch 50, the command relating to the rotational speed of the wiper motor 118, and inputs the command to the electricity conduction control section 158.

The electricity conduction control section 158 calculates the phases of the voltage that change in accordance with the position of the rotor 172 that is calculated by the motor position estimating section 154, and, on the basis of the calculated phases and the rotational speed of the rotor 172 instructed by the wiper switch 50, determines the driving duty value. Further, the electricity conduction control section 158 generates a PWM signal, which is a pulse signal corresponding to the driving duty value, and carries out PWM control that outputs the PWM signal to the driving circuit 126.

The driving circuit 126 is structured by a three-phase (U phase, V phase, W phase) inverter. As shown in FIG. 5, the driving circuit 126 has three N-channel field effect transistors (MOSFETs) 174U, 174V, 174W (hereinafter called "FETs 174U, 174V, 174W") that respectively serve as upper-stage switching elements, and three N-channel field effect transistors 176U, 176V, 176W (hereinafter called "FETs 176U, 176V, 176W" that respectively serve as lower-stage switching elements. Note that in cases in which there is no need to individually discriminate among the respective FETs 174U, 174V, 174W and FETs 176U, 176V, 176W, they are collectively called the and "FETs 174" and the "FETs 176", and when there is a need to individually discriminate thereamong, they are called by appending the letter "U", "V", "W" thereto.

Among the FETs 174 and the FETs 176, the source of the FET 174U and the drain of the FET 176U are connected to the terminal of a coil 140U, and the source of the FET 174V and the drain of the FET 176V are connected to the terminal of a coil 140V, and the source of the FET 174W and the drain of the FET 176W are connected to the terminal of a coil 140W.

The gates of the FET 174 and the FET 176 are connected to the electricity conduction control section 158, and the PWM signal is inputted. When an H-level PWM signal is inputted to the gates of the FETs 174 and the FETs 176, the FETs 174 and the FETs 176 are turned on, and current flows from the drains to the sources. Further, when an L-level PWM signal is inputted to the gates, the FETs 174 and the FETs 176 are turned off, and enter into states in which current does not flow from the drains to the sources thereof.

Further, the battery 80, a noise preventing coil 82, smoothing capacitors 84A, 84B and the like are structured at the wiper control circuit 122 of the present embodiment. The battery 80, the noise preventing coil 82 and the smoothing capacitors 84A, 84B structure a substantially direct current power source. Note that, although not illustrated in FIG. 5, a voltage sensor that detects the voltage of the battery 80, a current sensor that detects motor current that is the current of the coil 140 of the wiper motor 118, a thermistor for detecting the temperature of the substrate on which the wiper control circuit 122 is packaged, and the like are packaged.

Figure 6A:
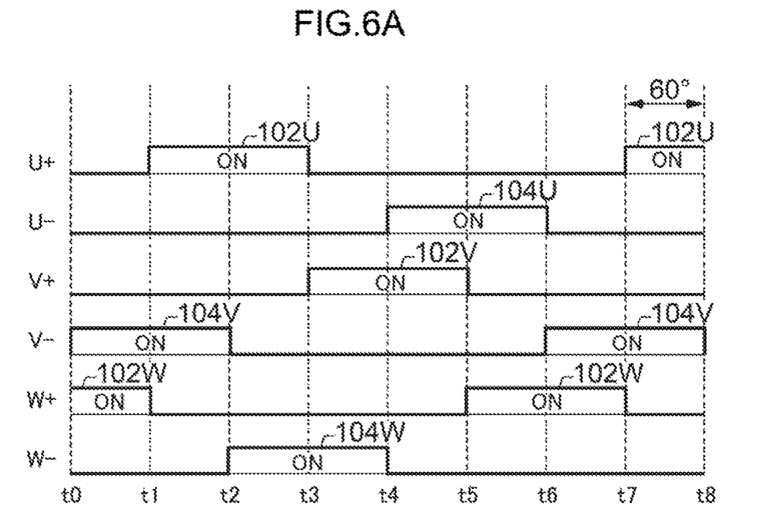
FIG. 6A is a timing chart showing an example of a pattern of conducting electricity to a coil in high-torque rotation control.
Figure 6B:
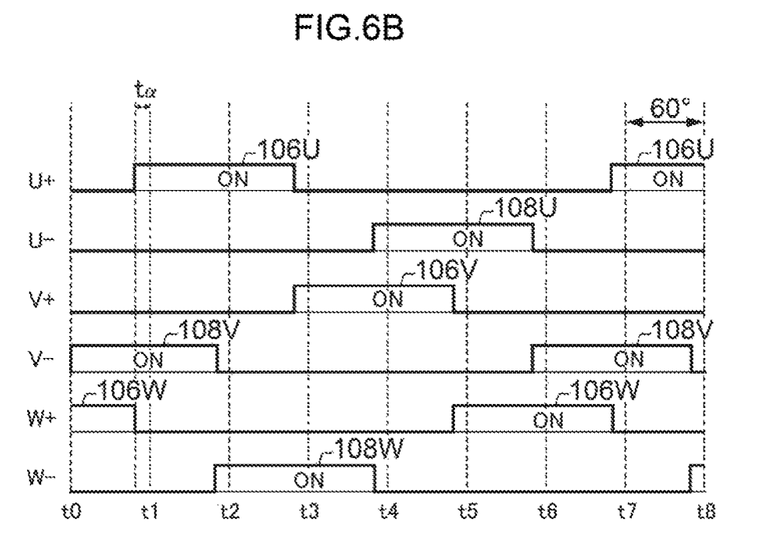
FIG. 6B is a timing chart showing an example of a pattern of conducting electricity to the coil in high-rotation control.

FIG. 6A is a time chart showing an example of a pattern of conducting electricity to the coils 140U, 140V, 140W in high-torque rotation control. In FIG. 6A, electricity conductions 102U, 102V, 102W and electricity conductions 104U, 104V, 104W that are shown by rectangles show the timings of conducting electricity to the coils 140U, 140V, 140W. In FIGS. 6A and B, the electricity conductions 102U, 102V, 102W and the electricity conductions 104U, 104V, 104W are shown by rectangles for convenience, but, in actual electricity conductions, voltage that is modulated in the form of pulses by PWM is applied to the coils 140U, 140V, 140W. Note that the unit time in FIGS. 6A and B (e.g., the interval from time t0 to time t1) is the time over which the rotor 172 rotates by an electrical angle of 60°. Further, the timings of the electricity conductions in FIG. 6A are timings corresponding to the positions of the magnetic poles of the rotor 172 that are detected by the Hall sensor 170.

From time t0 to time t1, the FET 174W and the FET 176V are on, and electricity is conducted from the coil 140W to the coil 140V. From time t1 to time t2, the FET 174U and the FET 176V are on, and electricity is conducted from the coil 140U to the coil 140V. From time t2 to time t3, the FET 174U and the FET 176W are on, and electricity is conducted from the coil 140U to the coil 140W. From time t3 to time t4, the FET 174V and the FET 176W are on, and electricity is conducted from the coil 140V to the coil 140W. From time t4 to time t5, the FET 174V and the FET 176U are on, and electricity is conducted from the coil 140V to the coil 140U. From time t5 to time t6, the FET 174W and the FET 176U are on, and electricity is conducted from the coil 140W to the coil 140U. From time t6 to time t7, the FET 174W and the FET 176V are on, and electricity is conducted from the coil 140W to the coil 140V. From time t7 to time t8, the FET 174U and the FET 176V are on, and electricity is conducted from the coil 140U to the coil 140V.

FIG. 6B is a time chart showing an example of a pattern of conducting electricity to the coils 140U, 140V, 140W in high-rotation control. In FIG. 6B, electricity conductions 106U, 106V, 106W, 108U, 108V, 108W are carried out at timings at which the electricity conduction timings are respectively earlier (advanced) by tα from the electricity conductions 102U, 102V, 102W, 104U, 104V, 104W of FIG. 6A. Because tα differs in accordance with the specifications and the like of the wiper motor, tα is concretely determined by simulations at the time of designing and by testing by using actual devices.

Generally, at a brushless DC motor, in a case in which the output shaft is rotated at high speed, it is effective to advance the electrical angle of the timing of conducting electricity to the respective phases of U, V, W. Further, in controlling the motor current while ensuring the torque of the output shaft, electricity is conducted to the respective phases of U, V, W at timings that correspond to the positions of the magnetic poles of the rotor 172 that are detected by the Hall sensor 170. In the present embodiment, in a case in which the output shaft 32 of the wiper motor 118 is rotated at high speed, as shown in FIG. 6B, the electricity conduction timings are advanced. In controlling the motor current while ensuring the torque of the output shaft, as shown in FIG. 6A, electricity is conducted to the respective phases of U, V, W at timings corresponding to the positions of the magnetic poles of the rotor 172 that are detected by the Hall sensor 170. Note that, in a case in which electricity is conducted to the respective phases of U, V, W at timings that are delayed from the electricity conduction timings shown in FIG. 6A, there are cases in which the torque of the output shaft 32 of the wiper motor 118 improves more. However, in a case in which the motor current increases, and further, the delay angle of the electricity conduction timing is excessively large, there is the concern that the wiper motor 118 will be unable to maintain the rotation of the output shaft 32, and loss of synchronism will occur.

In the present embodiment, in a case in which the wiper switch 50 is at the low-speed operation mode selecting position, low-rotation control is carried out, and, in a case in which the wiper switch 50 is at the high-speed operation mode selecting position, high-rotation control is carried out. As described above, in the low-rotation control, even if the torque of the output shaft 32 of the wiper motor 18 is made to be large, the motor current is suppressed more than in the case of high-rotation control. At the time when the wiper device 10 starts, in the majority of cases, the wiper switch 50 is switched from the stored (stopped) mode selecting position to the low-speed operation mode selecting position. However, there are cases in which, immediately after the starting of the wiper device 10, an obstacle such as accumulated snow or the like exists on the windshield glass 12. In the present embodiment, in order to remove such an obstacle by wiping, low-rotation control, which makes large the torque of the output shaft 32 of the wiper motor 18 in the low-speed operation mode that often has the chance of being selected immediately after starting, is carried out.

In the present embodiment, in a case in which the wiper switch 50 is switched from the low-speed operation mode selecting position to the high-speed operation mode selecting position, the duty ratio of the voltage that is applied to the coil of the wiper motor 118 is gradually increased, and the electricity conduction timing is gradually advanced, and control is switched from low-rotation control to high-rotation control.

Further, in the present embodiment, in a case in which the wiper switch 50 is switched from the high-speed operation mode selecting position to the low-speed operation mode selecting position, the duty ratio of the voltage that is applied to the coil of the wiper motor 118 is gradually decreased, and the electricity conduction timing is gradually delayed, and control is switched from high-rotation control to low-rotation control.

Further, in the present embodiment, as in the first embodiment, in a case in which the timing at which the wiper switch is operated is close to reversal positions, at the time when the wiper blades 28, 30 reach the reversal positions, control is carried out to change to a wiping speed that is based on the operation of the wiper switch 50. Due to this control, hunting of the wiping operation of the wiper blades in vicinities of the reversal positions can be suppressed, and the wiping speed of the wiper blades can be changed smoothly.

The disclosure of Japanese Patent Application No. 2017-017774 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A wiper device comprising:
   a wiper motor that operates wiper blades to wipe reciprocally by rotation of an output shaft; and
   a controller configured to:
      control rotation of the wiper motor in accordance with a command signal,
      in response to the command signal changing in a state in which the wiper blades that are performing reciprocal wiping operation are positioned in a switching prohibited region, which is before reversal positions of the reciprocal wiping operation, control the rotation of the wiper motor in accordance with a pre-change command signal until the wiper blades reach the reversal positions,
      at a time when the wiper blades reverse at the reversal positions, control the rotation of the wiper motor based on a post-change command signal, and
      in response to the command signal changing in a state in which the wiper blades that are performing the reciprocal wiping operation are positioned in a region outside of the switching prohibited region, perform control that gradually changes rotational speed from a rotational speed that corresponds to the pre-change command signal to a rotational speed that corresponds to the post-change command signal.

2. The wiper device of claim 1, wherein a time over which the rotational speed is gradually changed, or a rate of change in the rotational speed at which the rotational speed is gradually changed, is determined in advance.

3. The wiper device of claim 2, wherein the switching prohibited region is set so as to start from positions of the wiper blades that are an amount of time, which corresponds to a switching time needed in order to gradually change the rotational speed, or that are more than the amount of time, before a time when the wiper blades reach the reversal positions.

4. The wiper device of claim 3, further comprising a rotational angle sensor that senses a rotational angle of the output shaft, wherein:
   based on the sensed rotational angle, the controller calculates positions of the wiper blades and a rotational speed of the output shaft,
   the controller calculates the switching time based on the rotational speed of the output shaft and a predetermined rate of change in the rotational speed, and
   based on the positions of the wiper blades and the switching time, the controller determines whether the wiper blades are positioned in the switching prohibited region.

5. The wiper device of claim 1, wherein the switching prohibited region is set so as to start from positions of the wiper blades that are an amount of time, which corresponds to a switching time needed in order to gradually change the rotational speed, or that are more than the amount of time, before a time when the wiper blades reach the reversal positions.

6. The wiper device of claim 5, further comprising a rotational angle sensor that senses a rotational angle of the output shaft, wherein:
   based on the sensed rotational angle, the controller calculates positions of the wiper blades and the rotational speed of the output shaft,
   the controller calculates the switching time based on the rotational speed of the output shaft and a predetermined rate of change in the rotational speed, and
   based on the positions of the wiper blades and the switching time, the controller determines whether the wiper blades are positioned in the switching prohibited region.

* * * * *